United States Patent [19]
Mehnert et al.

[11] Patent Number: 5,535,142
[45] Date of Patent: Jul. 9, 1996

[54] CIRCUIT ARRANGEMENT FOR AN INDUCTIVE POSITION INDICATOR

[76] Inventors: Walter Mehnert, Grillparzer Strasse 6, 85521 Ottobrunn; Thomas Theil, Alte-Traubinger-Strasse 5, 82340 Feldafing, both of Germany

[21] Appl. No.: 94,574

[22] Filed: Jul. 21, 1993

[30]  Foreign Application Priority Data

Jul. 22, 1992 [DE]  Germany .......................... 42 24 225.8

[51] Int. Cl.⁶ ..................................... G01B 7/30
[52] U.S. Cl. ...................... 364/559; 33/708; 324/207.15; 324/207.17; 324/207.25
[58] Field of Search ............................. 33/706, 708, 784; 364/559; 324/207.17, 207.25, 207.16, 207.15

[56]  References Cited

U.S. PATENT DOCUMENTS

| | | | |
|---|---|---|---|
| 3,949,339 | 4/1976 | Kennedy | 336/135 |
| 4,295,278 | 10/1981 | Gloor | 33/784 |
| 4,464,721 | 8/1984 | McKenna | 364/559 |
| 4,468,745 | 8/1984 | Kjosavik | 364/559 |
| 4,611,293 | 9/1986 | Hatch et al. | 364/559 |
| 4,652,821 | 3/1987 | Kreft | 324/207.17 |
| 4,658,373 | 4/1987 | Murakami et al. | 364/559 |
| 4,829,250 | 5/1989 | Rotier | 364/559 |
| 5,109,194 | 4/1992 | Cantaloube | 324/207.17 |
| 5,150,115 | 9/1992 | deJong et al. | 324/207.25 |
| 5,168,222 | 12/1992 | Volsin et al. | 364/559 |
| 5,241,268 | 8/1993 | Lee | 324/207.17 |

FOREIGN PATENT DOCUMENTS

| | | |
|---|---|---|
| 337939 | 10/1989 | European Pat. Off. . |
| 367929 | 5/1990 | European Pat. Off. . |
| 1485646 | 9/1977 | Germany . |
| 3231990 | 3/1984 | Germany . |
| 3245501 | 6/1984 | Germany . |
| 3619285 | 12/1987 | Germany . |

*Primary Examiner*—Emanuel T. Voeltz
*Assistant Examiner*—Eric W. Stamber
*Attorney, Agent, or Firm*—Sughrue, Mion, Zinn, Macpeak & Seas

[57]  ABSTRACT

A circuit arrangement for an inductive position indicator which comprises a measurement coil arrangement having a plurality of measurement coils forming at least first and second groups, each of which supplies a measurement coil signal that varies with the position to be monitored, includes a computing circuit which, to produce a measurement signal, interlinks at least two signals derived from the measurement coil signals, in accordance with a predetermined algorithm. The circuit arrangement further includes a multiplexer for feeding a variable selection of measurement coil signals to the further processing, to achieve a high level of resolution and measurement accuracy.

17 Claims, 5 Drawing Sheets

CIRCUIT ARRANGEMENT FOR AN INDUCTIVE POSITION INDICATOR

BACKGROUND OF THE INVENTION

Inductive position indicators which are known in the form either of rotary or linear sensors are used to monitor the relative angular or linear position or movement a first one of two bodies, which are movable with respect to each other, occupies or performs with respect to the second one.

For this purpose a position indicator comprises at least one exciter coil to which an ac voltage is fed in order to generate a magnetic flux. Furtheron, flux guiding means of ferromagnetic material are provided, at least part of which is fixedly connected to one of said two bodies, whereas a measurement coil arrangement which comprises several measurement coils is fixedly connected to the other body. The flux guiding means guide the magnetic flux generated by said exciter coil in such a way that the flux passing through at least one of the measurement coils of said measurement coil arrangement changes if the relative position of said two bodies is changed because of a corresponding movement. The output signals of said measurement coils are used to generate either an ac measurement signal m, the amplitude of which represents the relative position to be monitored or a dc measurement signal M the absolute value of which is a measurement value of said position. In either case the respective analog value can be digitalized in order to obtain the measurement value in the form of a digital word.

One form of circuit arrangement for an inductive position indicator or sensor has a measurement coil arrangement comprising a plurality of measurement coils forming at least first and second groups, each of which supplies a measurement coil signal which changes with the position to be monitored. The circuit arrangement includes a computing or calculating circuit which, to produce a measurement signal, interlinks at least two signals derived from the measurement coil signals, in accordance with a predetermined algorithm. Such a circuit arrangement is used with measurement coil arrangements at which at least two measurement coil signals which can be referred to as a, b can be constantly taken off, and those signals exhibit amplitude responses which are different from each other when the inductive position indicator passes through its measurement range. It is assumed that both multiplicative and also additive interference parameters are incorporated into those two ac voltage signals a, b in corresponding fashion, and the influence thereof on the measurement result is to be reduced by using as the measurement signal a quotient m=(a−b)/(a+b) which is formed by means of the computing circuit in a procedure which will be described in greater detail hereinafter.

Complete elimination of the additive interference parameters from the quotient m is possible only when, as described in European patent application No. 92 112550.6, the measurement coil arrangement supplies signals from which additive interference phenomena have been eliminated by a difference-forming operation. If that is the case, one of the following quotients:

$$m=\Delta a/(\Delta a+\Delta b) \tag{1}$$

or $$m'=(\Delta a-\Delta b)/(\Delta a+\Delta b) \tag{2}$$

is advantageously used as the measurement signal, from which multiplicative interference phenomena are also totally eliminated by virtue of the quotient-forming operation.

A computing circuit for producing the quotients m and m' respectively can be so designed that disposed on the downstream side of first and second inputs to which the respective signals $\Delta a$ and $\Delta b$ are constantly supplied is an input amplifier whose output is connected to one end or the other of a chain of resistors comprising resistors of exactly the same size. Each of the two end points of the chain of resistors and each connecting point between each two successive resistors can be connected to a common output terminal by way of its own controllable switch. Of those controllable switches, there is only ever one that is closed, while all the others are open. Which of the switches is closed and which are open is established by a digital word which is produced by a counter and which serves to actuate the controllable switches.

The counter counts the oscillations of a voltage-controlled oscillator whose control input is connected to the output terminal of the chain of resistors. It is only when a voltage value of zero appears at that output that the oscillator stops and the count value attained by the counter represents the required measurement value m or m' respectively.

In other words: by means of the above-described computing circuit which is in the form of a regulating loop, the input signals $\Delta a$ and $\Delta b$ are weighted with the factors m and 1−m, and 1−m' and 1+m' respectively, and then summed. The value m and m' respectively is varied until the sum signal is equal to 0. That corresponds to solving the above equation (1) in accordance with:

$$\Delta a'(1-m)-m\bullet\Delta b=0 \tag{3},$$

in which respect a particular advantage is to be seen in the fact that m is also available as a digital word.

In order to achieve a high degree of resolution, instead of a resistor series circuit, it is possible to provide two resistor chains which are arranged in hierarchical graded relationship, of which the first receives the pre-amplified input signals $\Delta a$, $\Delta b$ in the above-described manner. The switches which are associated with the tapping points of that first resistor chain lead alternately to one end point and the other of the second resistor chain which is also connected by switches to the output terminal of this arrangement, in the above-described manner. Of the switches associated with the first resistor chain, there are always two immediately successive switches that are closed simultaneously, while all others are open. Cyclic actuation of the pairs of switches in the closed condition by means of the most significant bits of the digital word supplied by the counter provides a coarse division effect. The switches disposed on the output side of the second resistor chain are individually closed in succession for each closed pair of switches of the first chain, by means of the least significant bits of the digital word, as was described above in relation to the switches of the individual resistor chains. The second resistor chain therefore represents a fine division operation. With such a graded arrangement, for example with 2×64 resistors, it is possible to achieve a level of resolution of 12 bits, for which 1024 resistors would be necessary when using a single resistor series circuit.

It will be appreciated however that this principle of hierarchical grading of a plurality of resistor chains cannot be prolonged just as desired, as a specific operational amplifier is required for decoupling of each one of the lines which jointly go to the subsequent resistor chains, so that the level of expenditure required in that respect quickly exceeds the savings achieved in terms of resistors.

SUMMARY OF THE INVENTION

An object of the present invention is to provide a circuit arrangement for an inductive position indicator or sensor, which permits a high degree of resolution and a high level of measurement accuracy at minimum circuitry cost.

Another object of the present invention is to provide a circuit arrangement for a position indicator or sensor, having an enlarged measurement range which can be covered with a high level of linearity.

The foregoing and other objects are attained by the circuit arrangement in accordance with the invention as set forth herein.

The multiplexer which is provided in accordance with the invention and which preferably forms the input stage of the circuit arrangement according to the invention may contribute to the attainment of the objects of the invention in a number of ways, depending on which measurement coil arrangement is employed and depending on the configuration of the computing circuit. In an ideal situation, that is to say when using a particularly advantageous measurement coil arrangement and a particularly desirable computing circuit, all the ways in which the multiplexer contributes to attainment of the objects of the invention come into play simultaneously and in mutually supportive mode.

It will firstly be assumed here that the circuit arrangement according to the invention is employed with a measurement coil arrangement which, as disclosed in European patent application No 92 112550.6, has first and second measurement coil groups, each of which comprises first and second measurement coils which embrace flat or surface elements so arranged that they exactly adjoin each other and cover the entire geometrical measurement range. In that arrangement the elements of the one group of measurement coils overlap those of the other and are arranged in displaced relationship therewith in the direction of movement of the position indicator so that the two difference signals a and b which are supplied by the groups of measurement coils, with the exception of specific zero point positions, are constantly of different amplitudes.

In connection with such a measurement coil arrangement which supplies only first and second output difference signals, the multiplexer which is provided in accordance with the invention is used to feed those two difference signals successively in respect of time into a single-channel signal processing section which includes the input amplifier of the circuit arrangement. That is possible because the additive interference parameters have already been eliminated from those difference signals, so that changes in relation to time in those additive interference phenomena play no part, in spite of the signals which are to be processed not being simultaneously passed to the computing circuit which is connected on the output side of the single-channel signal processing section.

Single-channel input amplification gives the following advantages: as the measurement coils of the inductive position indicator represent a low-resistance signal source, the input amplifier should have a high-resistance input in order to achieve a high level of measurement accuracy. That means however that the input offset voltage is also high, which voltage however is not also amplified in the SC-amplifiers which are preferably employed here. Nonetheless circuit arrangements which operate on a two-channel basis must use pairs of input amplifiers which are very carefully matched to each other in regard to their input offset voltage and in particular their temperature dependency. That is already expensive when using a discrete structure and, when the circuit arrangement is in the form of an integrated circuit, results in a considerable increase in cost. Admittedly, there are circuit arrangements in which the attempt is made to eliminate the input offset voltage, which is a dc voltage, by capacitively coupling out the output signals. If in contrast, in accordance with the invention, only a single input amplifier is used, the input offset voltage and gain factor thereof are involved in the same fashion in all signals which are passed to the computing circuits, and can easily be eliminated from the measurement result. That therefore gives a considerably reduced amount of circuitry and thus also a reduction in cost, in comparison with the two-channel arrangement.

A further measurement coil arrangement, for example as described in European patent application No 92 112550.6, has more than two measurement coil groups in order to enlarge the measurement range which can be covered with a high degree of linearity, wherein once again each group includes first and second measurement coils which exactly adjoin each other in such a way that they cover the entire measurement range (for example 360° in the case of a rotary sensor) and which jointly supply a difference signal from which the additive interference phenomena have already been eliminated. In this case also the surface elements of the various groups of measurement coils are arranged in displaced relationship in the direction of movement (for example, in the case of a rotary position indicator, and with three groups of measurement coils, through 60° in each case, or, with four groups of measurement coils, through 45° in each case).

In this case therefore the arrangement always provides as many difference signals as it has groups of measurement coils.

As, out of that multiplicity of difference signals, the computing circuit only ever requires two in order exactly to ascertain the measurement value m in accordance with the procedures set forth in the opening part of this specification, the multiplexer provided in accordance with the invention can be used here to run through all possible combinations in pairs of those difference signals, until finding that one with which it is possible for the voltage supplied to the voltage-controlled oscillator to be adjusted or aligned to zero. To put that another way: here, in conjunction with the measurement coil arrangement, by virtue of suitable actuation, the multiplexer provides for ascertaining a higher coarse measurement value or the most significant bits of a digital word which represents the exact measurement value. If it is assumed that the computing circuit, in the above-described manner, includes first and second hierarchically graded resistor chains or equivalent circuit arrangements, then, the combination of the multiplexer according to the invention with the described measurement coil arrangement provides a higher hierarchical plane which is formed by the groups of measurement coils themselves and which does not require additional decoupling amplifiers or the like. When that specific function of the multiplexer is carried out, further signal processing can be effected both in a single-channel mode in the above-indicated manner and also in a two-channel mode.

In the former case the signals of the computing circuit, which belong to each of the permutated pairs of difference signals, are successively fed by way of the single-channel signal processing section which includes the input amplifier, thus affording the above-discussed advantages.

In the second case, the signals belonging to each of the pairs of difference signals are applied to the computing circuit by way of two parallel signal processing sections.

Admittedly, that gives rise to the above-mentioned difficulties in terms of input offset voltage adjustment and the gain factors of the two input amplifiers which are then used, but it may be desirable in situations of use which involve multiplicative interference phenomena which change at a rate which is comparable to the frequency at which, when operating a single-channel arrangement, the system is switched over from one channel to the other as, by virtue of such rapid changes, in the two signals which are successively fed to the computing circuit, there may be different interference components which are then not totally eliminated in the quotient-formation operation.

However it will be noted that such situations of use are rare and it can generally be assumed that the multiplicative interference phenomena change so slowly that equal components thereof are involved in signals which are successively acquired by virtue of the single-channel nature of the arrangement. In that case, the quotient-formation operation results in the desired complete correction effect, even with signal processing which is of single-channel mode in the input portion, so that the advantages of the single-channel arrangement can be put to use.

If the last-described measurement coil arrangement is in the form of a printed circuit, the problem can arise that each group of measurement coils requires its own conductor track plane, and that can give rise to adjustment problems.

In order to avoid that, European patent application No 92 112550.6 describes a further measurement coil arrangement in which the groups of measurement coils which are used for instantaneous difference signal production can be 'shifted' beyond the measurement range, by a procedure whereby conductors which separate mutually adjacent surface regions from each other have controllable on/off switches which, in the closed condition, activate the respective conductor which can also be referred to as a separating leg or separating conductor, in such a way that it separates from each other the two surface elements which adjoin same, so that they belong to different measurement coils, while in the open condition the switches eliminate the separation function of the conductor in question so that the two surface elements adjoining same are embraced by one and the same measurement coil.

The controllable on/off switches which must be actuated for the active surface elements to 'travel' in that way, with the movement to be monitored, can advantageously be integrated into the multiplexer which is provided in accordance with the invention, and can also be actuated by the control signals which are supplied to the multiplexer. Otherwise, with this measurement coil arrangement, the multiplexer can also be used for determining the most significant bits directly by means of the measurement coil arrangement and/or for single-channel or two-channel input signal processing, as was described above.

While, in the above-discussed measurement coil arrangements, which are as disclosed in European patent application No 92 112550.6, the difference signals are produced by virtue of the measurement coils of a group having common conductors, a further arrangement, which is also disclosed in that application, provides that the entire measurement range is covered by a multiplicity of surface elements which admittedly also exactly adjoin each other in the direction of movement, but each of which is embraced by its own measurement coil which has conductor portions which are not common to any other measurement coil. In that design configuration, for the purposes of eliminating additive interference phenomena, the outputs of each two measurement coils which then again form a group are fixedly connected together so that each pair of measurement coils supplies a difference voltage which can be used for the above-discussed operation of forming a quotient m'. In this case also more than two difference signals are constantly available and the multiplexer is again used to make the choice required for the respective indicator position, in which respect further processing may be equally in a single-channel or two-channel mode, as above. In this case also the multiplexer makes use of the measurement coil arrangement to determine the most significant bits of a digital word which represents the exact measurement value, insofar as it causes the active measurement coils to also move along with the movement of the position indicator, by switches being suitably closed and opened.

A further advantage of using a multiplexer in accordance with the present invention is that it easily permits the interchange of measurement coil output terminals for changing the sign of the respective voltages which are to be subjected to further processing. That provides for a simplified configuration for the subsequent signal processing circuits.

Further objects, features and advantages of the present invention will be apparent from the following description of preferred embodiments.

DESCRIPTION OF PREFERRED EMBODIMENTS

Figure 1:
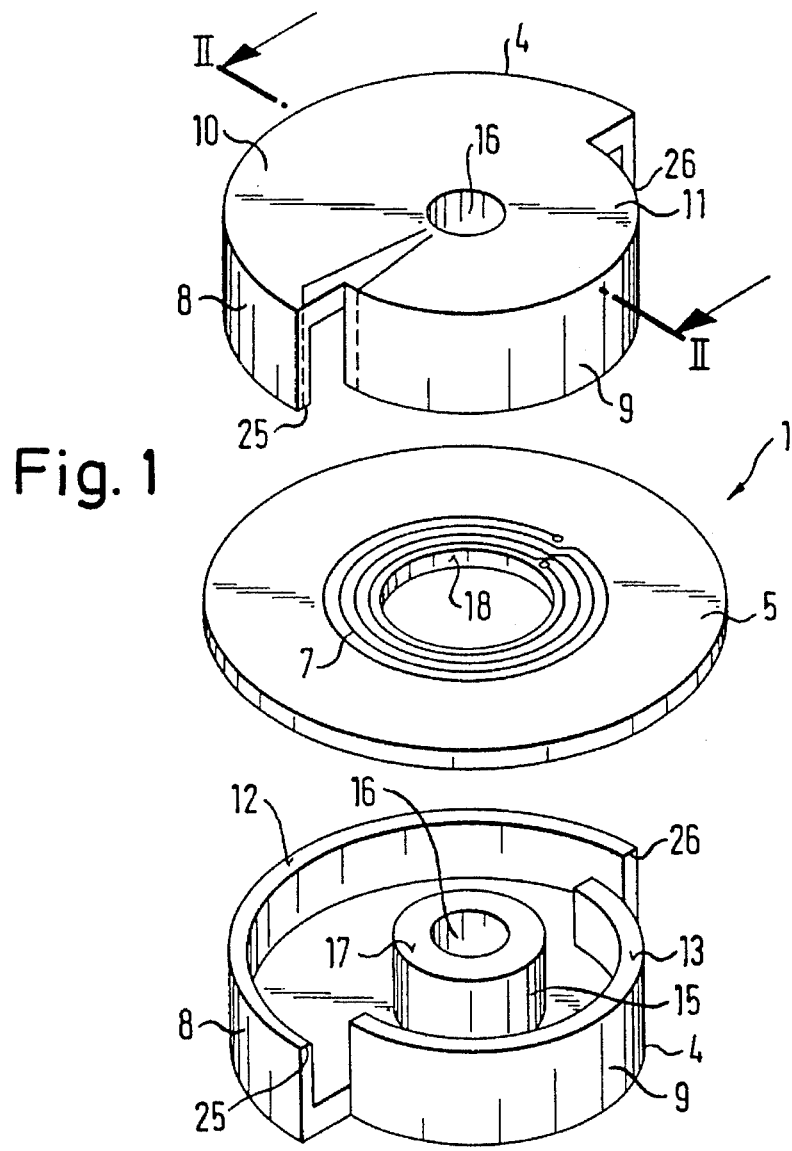
FIG. 1 is a perspective exploded view of an inductive rotary position indicator with which the circuit arrangement according to the invention can be used.
Figure 2:
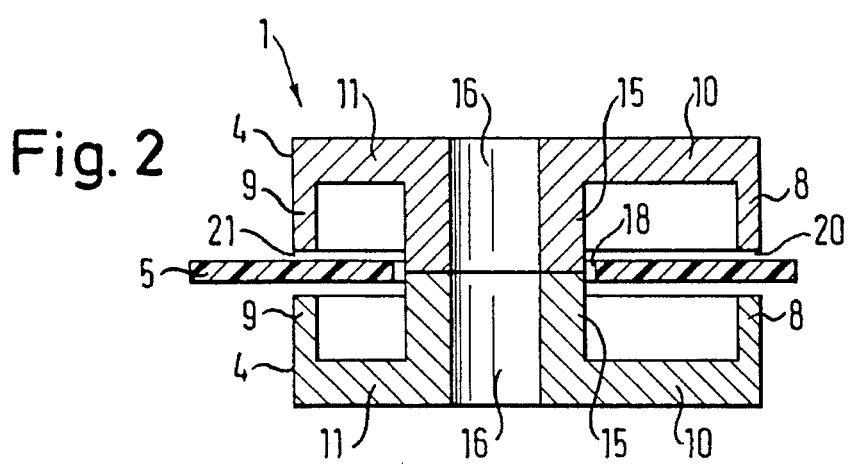
FIG. 2 is a view in section through the indicator in FIG. 1 in the assembled condition taken along line II—II in FIG. 1.

Referring to FIGS. 1 and 2, shown therein is an example of the mechanical structure of a position indicator or sensor in the form of a rotary indicator which is used for measuring and monitoring a rotary movement which is performed by one of two members or bodies (not shown), relative to the other. The illustrated indicator includes first and second identical core shells each of which is indicated at reference 4 as well as a carrier plate or board 5 of generally disk-like configuration, which carries in the form of printed circuits both an exciter coil 7 and also measurement coils which are not shown in FIG. 1 but which are described in greater detail hereinafter with reference to FIGS. 5 through 7.

Each of the two core shells 4 comprises two hollow semicyclindrical portions which are integrally connected together and which are closed off at one end by a bottom wall portion 10 and 11 respectively, and which are of different radii and are so arranged that the axes of the cylindrical portions and their edges which extend along the respective diameter coincide, wherein their outwardly curved semicylindrical walls 8 and 9 are oriented away from each other.

The two bottom walls 10 and 11 which can be of the same thickness in the axial direction of the semicylindrical portions blend integrally into each other. A centrally disposed, integrally connected projection 15 extends in the axial direction and is of an axial height which is greater than that of the semicylindrical walls 8 and 9. In the longitudinal direction, the projection 15 has passing therethrough a concentric bore which is indicated at 16 and which can serve to receive a shaft, around the axis of which are rotatable the two bodies whose mutual relative positioning is to be measured and monitored. In the assembled condition of the position indicator, as shown in FIG. 2, the two core shells 4 are fixedly connected together in such a way that the end faces 17 of the respective projections 15 bear against each other, with the bores 16 being aligned with each other and the axial end faces 12 and 13 of the semicylindrical wall portions 8 and 9 respectively being disposed opposite each other at a spacing from each other, thereby defining between them gaps as indicated at 20 and 21 in FIG. 2.

The carrier plate or board 5, as indicated above, is in the form of a circular disk having a central opening 18 whose diameter is somewhat larger than the outside diameter of the projections 15.

As shown in FIG. 2 the carrier board or plate 5 is so arranged that the two projections 15 extend through its central opening 18 and it extends parallel to the bottom wall portions 10 and 11 of the core shells 4, extending through the gaps 20 and 21. For operation of the assembly, the carrier plate or board 5 is non-rotatably connected to one of the two bodies whose relative rotary movement is to be monitored, while the two core shells 4 are non-rotatably connected to the other of the two bodies.

The magnetic flux generated by the exciter coil 7 is afforded two substantially symmetrical, annularly closed paths which are essentially of the seine magnetic resistance or reluctance, namely a measurement path and a compensating path. The measurement path extends inter alia across the gap 20 which is defined between the semicylindrical wall portions 8 so that the magnetic flux which goes along that path can pass through the measurement coils disposed on the carrier plate 5.

Figure 5:
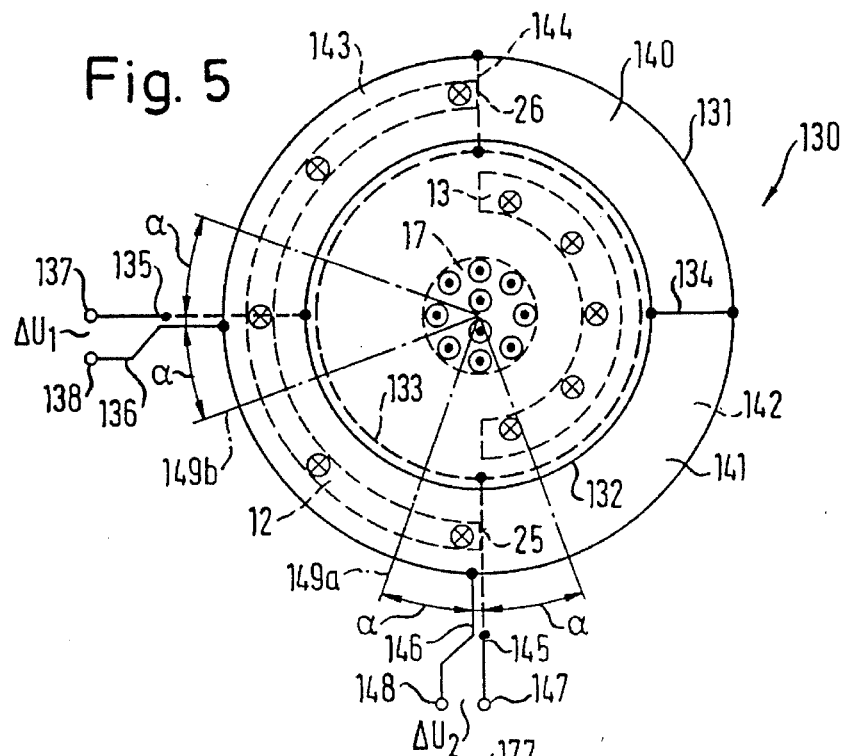
FIGS. 5 through 7 show measurement coil arrangements which can be used with the indicator shown in FIGS. 1 and 2 and the circuit arrangement according to the invention.
Figure 6:
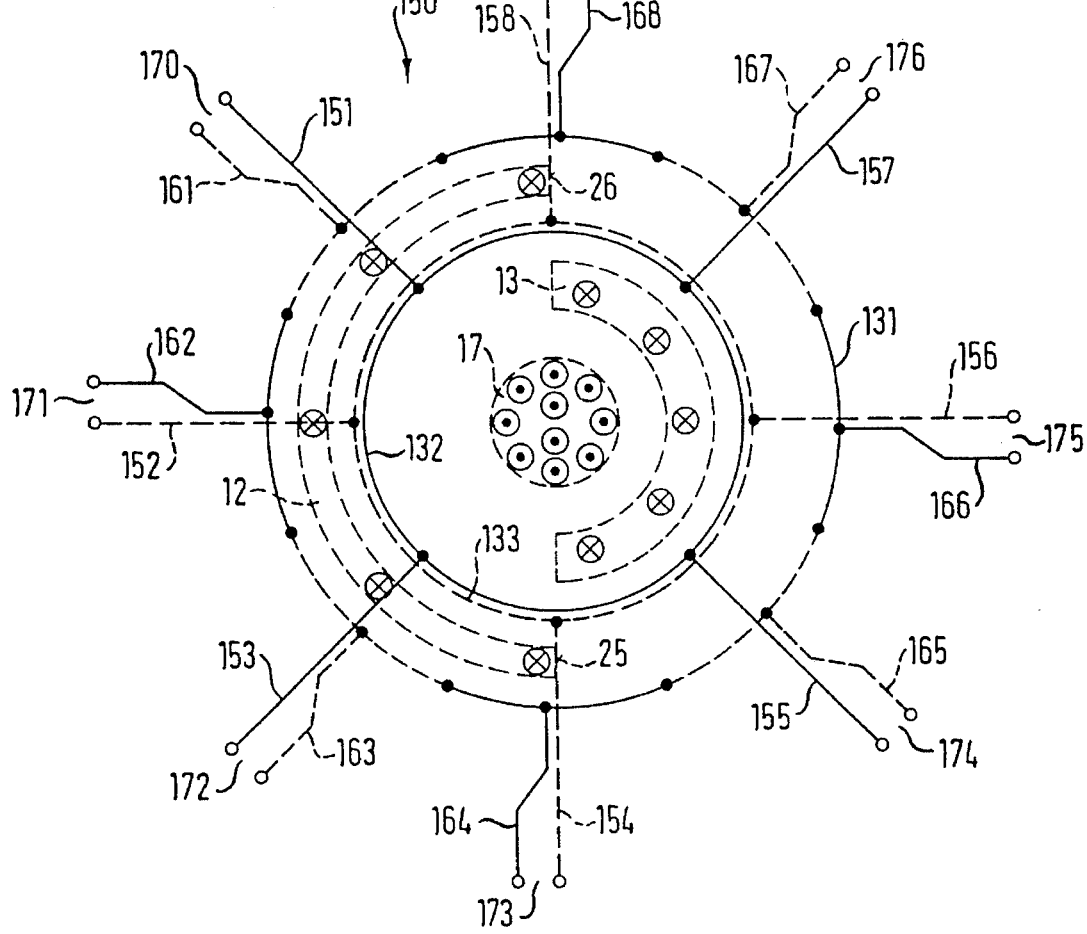
Figure 7:
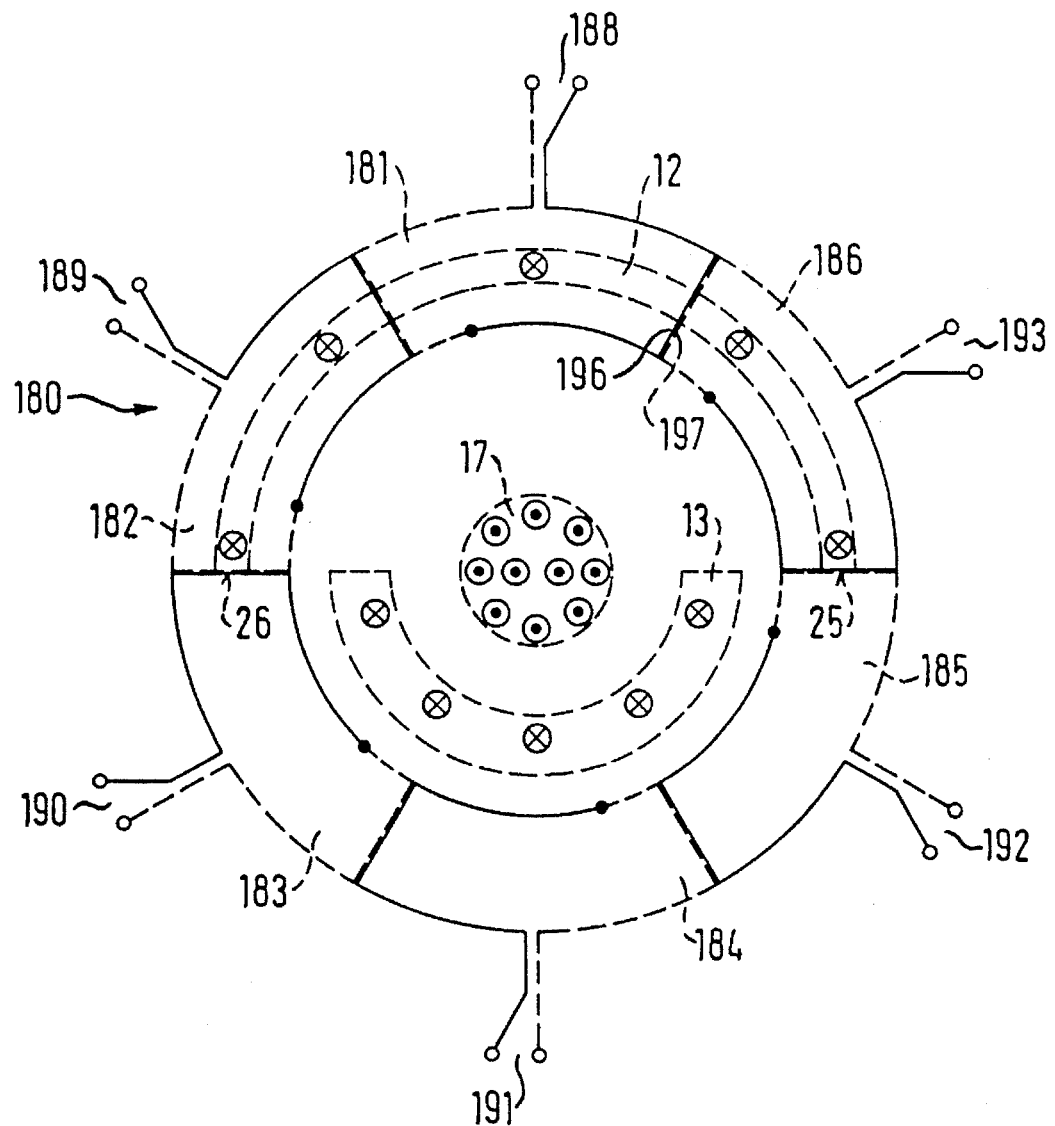

As the magnetic flux portions passing along the measurement path and the compensating path are constant independently of position, a rotary indicator of that kind is distinguished by virtue of a high degree of symmetry and is absolutely reaction-free. It can be used with any of the measurement coil arrangements which are shown in FIGS. 5 through 7 and which are particularly advantageous by virtue of their different properties for respective other situations of use, The latter consideration also applies in regard to the circuit arrangements 30 and 30' shown in FIGS. 3 and 4. Therefore in those Figures, the sensor which includes the measurement coil arrangement is only diagrammatically shown as a block 31 which is connected by way of a multiple line 32 to a multiplexer 33 which forms the input stage of the circuit arrangement 30 or 30' respectively and which receives its control signals from a system control 34 connected to an oscillator 35 which supplies the clock frequency and which also simultaneously actuates the exciter coil of the sensor 31 by way of a line 37.

The number of individual signal lines included in the line 32 depends on the nature of the respective measurement coil arrangement used and will be described in greater detail, when describing the measurement coil arrangement.

In the present context, the only point of significance at this stage is that the measurement coil arrangement constantly supplies two or more signals which either directly represent difference signals from which additive interference phenomena have already been eliminated, or from which such difference signals can be formed directly in the multiplexer 33. If the measurement coil arrangement supplies only two such signals, the only purpose of the multiplexer 33 is to feed those signals successively in respect of time into the subsequent single-channel signal processing section. If there are more than two output signals at the measurement coil arrangement, the multiplexer 33 also has to select that pair of signals which is used ultimately for forming the measurement value which reproduces the instantaneous position of the position indicator.

For the purposes of the broad description hereinafter of the circuit arrangements 30 and 30' shown in FIGS. 3 and 4 respectively, it is merely assumed that the system has to effect further processing of two signals a and b which may be amplified, and which are initially ac voltage signals and, in the further course of the processing operation, the dc voltage amplitude values A and B of those ac voltage signals. In that situation, at each given moment in time, one of those dc voltage amplitude values, for example A, is present as a positive voltage, and one such value, for example $-B$, is a negative voltage. Multiplication is effected with factors f and g respectively, and the resulting weighted signals A•f and $-B$•g are summed. The weighting factors f and g must then be changed until the sum A•f+($-B$)•g assumes a predetermined value, for example '0'. Depending on the respective nature of the measurement coil arrangement used, the factors f and g can be correlated together in different ways. That will be described in greater detail hereinafter, in conjunction with the description of the measurement coil arrangements.

It is a matter of significance here that the weighted signals can only be produced in the form (A+off)•f and ($-B$+off)•g, in which respect 'off' is the offset input voltage of an input amplifier 36 which is connected immediately on the output side of the multiplexer 33. Therefore, the sum of the weighted signals is the expression A•f+($-B$)•g+off•(f+g), from which the last term must be subtracted in order to obtain the actually desired expression A•f+($-B$)•g. Since, as will be further described hereinafter, the above-mentioned summing and subtraction operation is effected by means of a summing analog circuit, the expressions (A+off)•f, ($-B$+off)•g and $-$off•(f+g) must be put into intermediate storage because of the initially single-channel processing mode involved.

Therefore, provided for each of the three values indicated above, is a storage or memory circuit into which the associated value is put and is stored therein until the respective and other values are available. All that is effected under the management of the system control 34 which defines three different periods of time in which the multiplexer 33 and the single-channel processing section on the output side thereof produce the signals (A+off)•f, ($-B$+off)•g and $-$off•(f+g).

Figure 3:
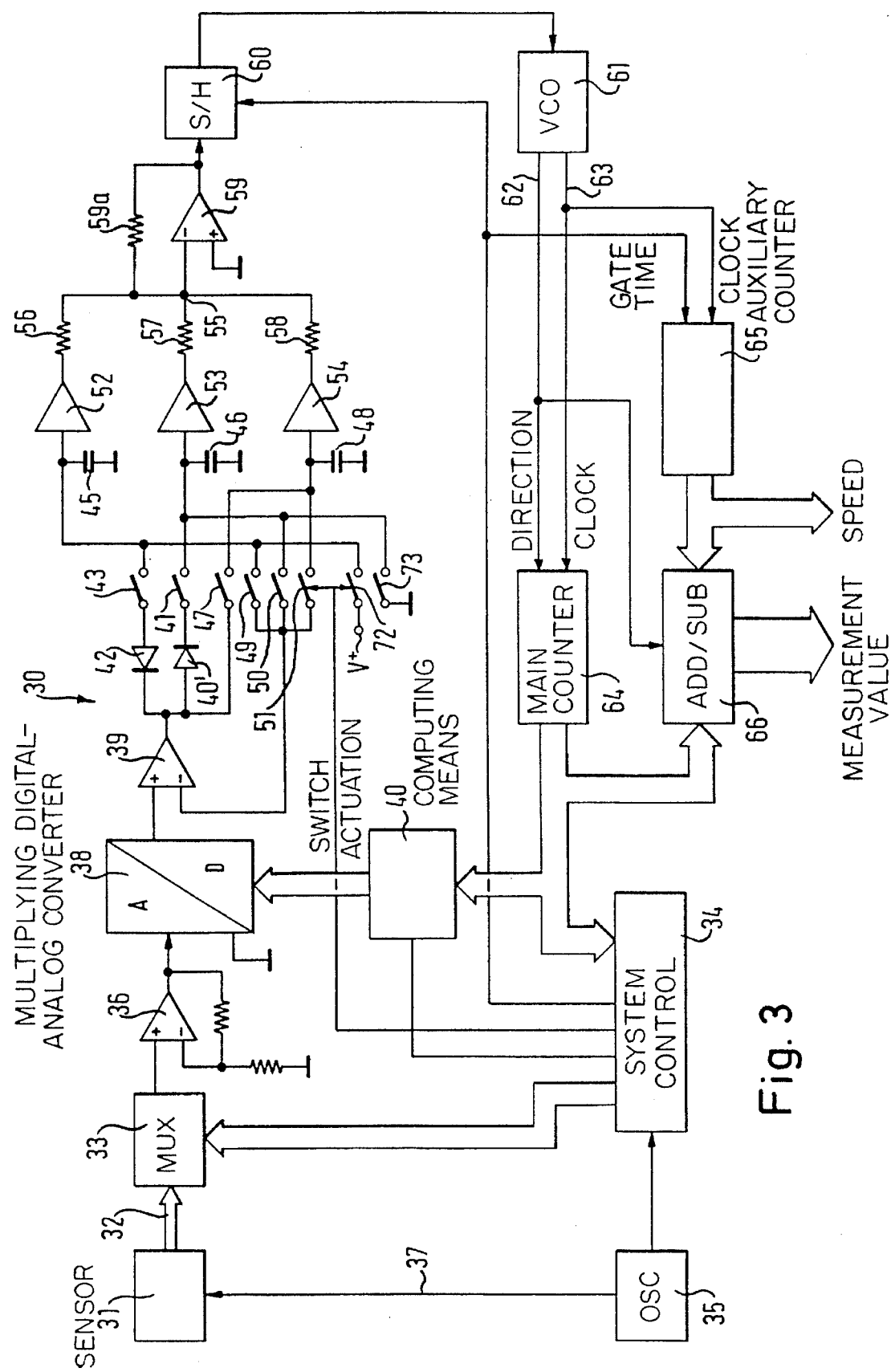
FIG. 3 shows a first embodiment of the circuit arrangement according to the invention, in which the ac voltage signals supplied by the measurement coil arrangement are weighted after amplification thereof and prior to peak value detection.
Figure 4:
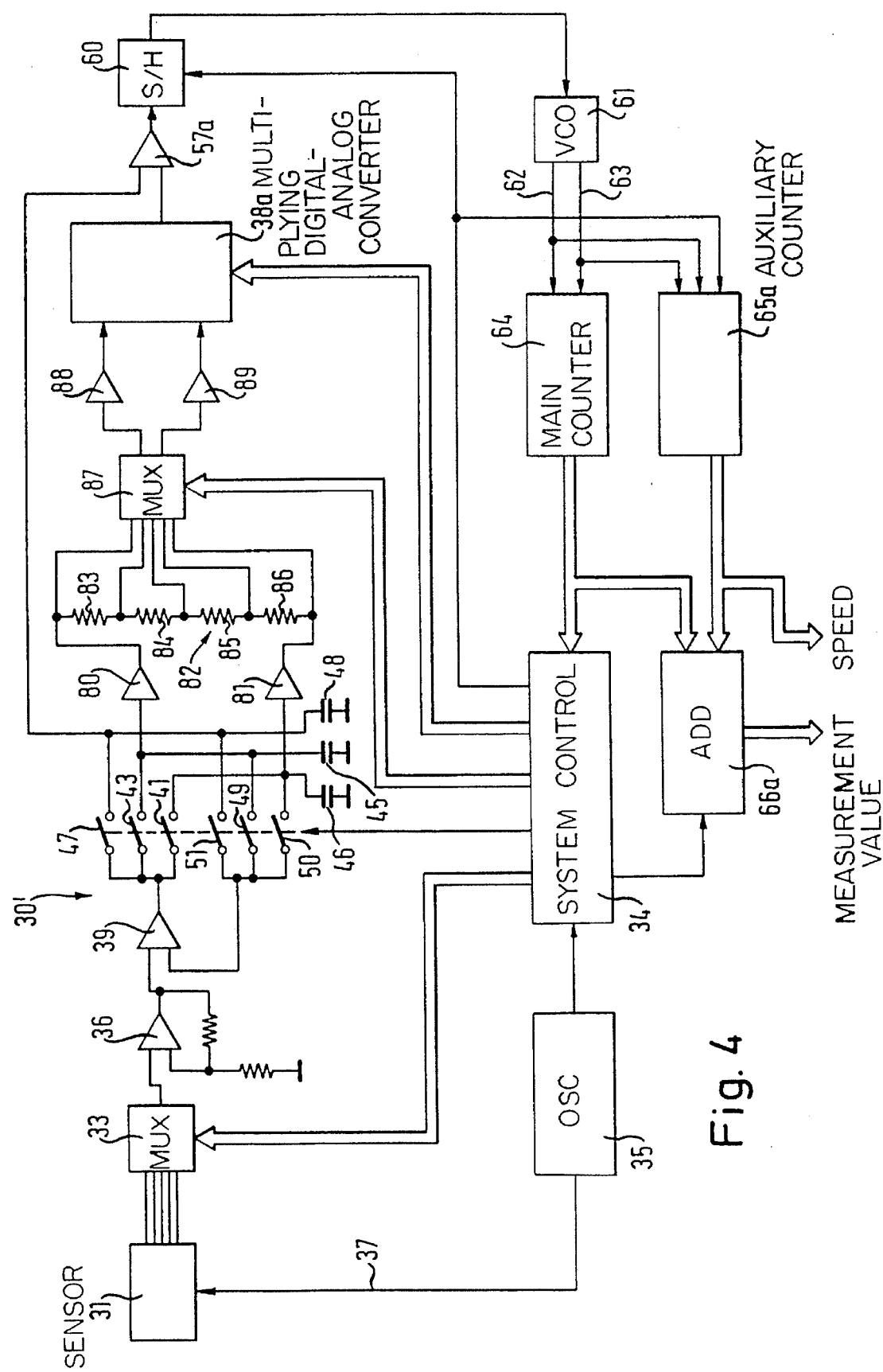
FIG. 4 shows a further embodiment of the circuit arrangement according to the invention in which weighting is effected after amplitude value detection and the resolution capability is increased by an external resistor series circuit.

The foregoing considerations apply in a similar manner to the two circuit arrangements 30 and 30' shown in FIGS. 3 and 4. In both thereof, the multiplexer 33, for forming the expressions (A+off)•f and ($-B$+off)•g, firstly applies the respectively corresponding measurement coil signal to the subsequent single-channel signal processing section which, in the arrangement shown in FIG. 3, besides the input amplifier 36, includes a digital-analog converter 38 for performing the multiplication operation and an amplifier 39 for actuating the memory circuits 45 and 46 which are required for the above-mentioned value-storage operation. In FIG. 4 on the other hand, that single-channel signal processing section only includes the input amplifier 36 and the driver stage 39 while the multiplying digital-analog converter 38a is arranged only downstream of the storage or memory circuits 45, 46, that is to say in the two-channel area of the arrangement. In other words: in the embodiment shown in FIG. 3, the ac voltage signals of the measurement coil arrangement are only weighted after they have been amplified, and then rectified and summed, while in the embodiment shown in FIG. 4 they are immediately rectified and the dc voltage values resulting therefrom are, by multiplication, weighted and then summed.

Reference will now be made to FIG. 3 to describe the basic mode of operation of the circuit arrangement according to the invention:

The digital-analog converter 38 operates as a multiplier by virtue of its digital input receiving a digital word which is formed by a computing means 40 under the management of the system control 34 from the count value which a main counter 64 has reached at the time in question. In that situation the system control 34 controls the computing means 40 in such a way that, from that count value, it forms a digital word corresponding to the factor f, in the period during which the signal (a+off) is at the output of the input amplifier 36. In a period of time during which the signal (b+off) appears at the output of the input amplifier 36, in contrast, the computing means 40 produces a digital word corresponding to the factor g while in periods during which the multiplexer 33 short-circuits the input of the input amplifier 36 by virtue of corresponding control signals from the system control 34, so that only the signal 'off' appears at the output of the amplifier, the computing means produces a digital word corresponding to the expression −(f+g).

The digital-analog converter 38 multiplies the analog signal which is applied at its respective reference voltage inputs, relative to ground, by the factor which is predetermined by the corresponding digital word so that, in the various periods of time, the ac voltage signals (a+off)•f and (b+off)•g, which are shifted by the dc voltage offset value off, and the dc voltage signal −off•(f+g), appear at the output of the converter.

The output of the digital-analog converter 38 is connected to the 'plus' input of a differential amplifier 39 whose output is connected to a controllable switch 41 by way of a diode 40' which is connected in the forward direction and to a controllable switch 43 by way of a diode 42 which is connected in the reverse direction, the switch 43 going to a storage capacitor 45 and the switch 41 going to a storage capacitor 46. In addition the output of the differential amplifier 39 is directly connected to a storage capacitor 48 by way of a controllable switch 47.

In addition the 'minus' input of the differential amplifier 39 is connected by way of a controllable switch 49 to the connecting point between the switch 43 and the capacitor 45, by way of a controllable switch 50 to the connecting point between the switch 41 and the capacitor 46, and by way of a controllable switch 51 to the connecting point between the switch 47 and the capacitor 48.

When the output of the digital-analog converter 38 supplies the superposed ac voltage signal (a+off)•f, the system control 34 closes the switches 41 and 50 while the switches 43, 47 and 49, 51 are opened.

As a result the first positive half-wave of the above-mentioned ac voltage signal can charge up the storage capacitor 46 by way of the diode 40' and the closed switch 41, to its peak value. If the peak value is exceeded, the capacitor 46 does not discharge by virtue of the rectifier effect of the diode 40'. The feedback by way of the switch 50 serves to compensate for the breakdown voltage of the diode 40' and the switch resistance of the switch 41, that is to say, not to allow same to be included in the voltage value (A+off)•f which is stored in the storage capacitor 46.

If in contrast the ac voltage (b+off)•g appears at the output of the digital-analog converter 38, the system control 34 closes the switches 43 and 49 and opens the switches 41, 47, 50 and 51. As a result, in the same manner as described above in relation to the capacitor 46, the storage capacitor 45 is now charged by the first negative half-wave of the ac voltage signal (b+off)•g to the negative amplitude peak value (−B+off)•g.

By suitable interchange of the measurement coil terminals, by means of the multiplexer 33, each half-wave can be made 'positive' or 'negative' respectively, so it can be used for charging the storage capacitors 46, 45. In that way the peak value detection circuit which is described herein is made particularly simple and there is no need for each second half-wave to be omitted in the signal processing operation. That means that the measurement speed can be substantially increased.

In a third phase in which the multiplexer 33 short-circuits the input of the input amplifier 36 and the system control 34 causes the computing means 40 to produce the digital word −(f+g), there appears at the output of the differential amplifier 39 the dc voltage value −off•(f+g) which, when the switches 41, 43, 49 and 50 are opened and the switches 47 and 51 are closed, charges up the storage capacitor 48 and is stored therein.

Thus, after the conclusion of this third phase, the voltage values required for the above-discussed sunning and correction operations are available at the storage capacitors 45, 46 and 48. Those voltage values are passed by way of impedance converters 52, 53 and 54 whose high input resistances prevent discharging of the storage capacitors 45, 46 and 48 to a summing network which is formed by resistors 56, 57 and 58 which lead from the impedance converter outputs to a summing point 55, an operational amplifier 59 which is connected by its negative input to the summing point 55, and a feedback resistor 59a which goes from the output of the operational amplifier 59 back to the summing point 55.

Thus, after production and storage of the signals (A+off)•f, (B+off)•g and −off•(f+g), there appears at the output of the operational amplifier 59 the dc voltage sum signal A•f+(−B)•g which has been freed of the input offset voltage of the input amplifier 36 and which is to be made equal to zero by the regulating loop, which will be described in greater detail hereinafter, of the circuit arrangement 30, for the purposes of ascertaining the measurement value which reproduces the instantaneous position of the position indicator.

The above-mentioned sum signal which can assume both positive and also negative voltage values is put into intermediate storage in invariable form in a sample-and-hold circuit 60 for the next cycle time which is predetermined by the system control 34, and applied to the control input of a circuit unit 61 which includes a voltage-controlled oscillator and has two outputs 62 and 63. At the 'direction' output 62 there appears a signal which reproduces the sign of the voltage stored in the scruple-and-hold circuit 60 while appearing at the 'pulse' output 63 are clock pulses of the voltage-controlled oscillator, the repetition rate of which changes with the absolute value of the voltage stored in the sample-and-hold circuit 60 and becomes zero when that voltage assumes the value of zero.

The output 63 of the circuit unit 61 supplies the clock pulses for the main counter 64 whose count direction is determined by the signal which appears at the direction output 62 of the circuit unit 61.

Therefore, as long as the sum signal stored in the sample-and-hold circuit 60 is not of the value zero, the counter 64 counts up or down, more specifically at a rate which increases in proportion to an increasing absolute value of the sum signal.

If it is assumed that the sum signal is of a value that is different from zero, the counter 64 changes its counter condition in such a fashion that, in the next measurement cycle which is performed by the system control 34, the computing means 40 receives a count value which is different from the preceding measurement cycle. As a result the computing means 40 produces different factors f' and g' from those involved in the preceding cycle so that fresh signals (A+off)•f', (–B+off)•g' and –off•(g'+f') now appear, with unchanged measurement coil signals, at the output of the differential amplifier 39. As the first ones of those two signals can be smaller than the corresponding signals in the preceding cycle, it is necessary, for them to be properly stored, that, prior to their production, the storage capacitors 45 and 46 have been completely discharged. That has been effected by the system control 34 prior to the commencement of the new cycle by means of the controllable switches 72 and 73 of which the first goes to the positive voltage V+ while the second goes to system ground. As the storage capacitor 48 which stores the dc voltage signals –off•(f+g) and –off•(f'+g') is not charged up by way of the diode 42, the feedback by way of the switch 51 is sufficient in relation thereto, for any reduction in voltage.

The change which is carried out in the new measurement cycle in respect of the factors f and g to give factors f' and g' is effected in such a way that the signal which is supplied to the sample-and-hold circuit 60 at the end of this new cycle is closer to zero than the signal which was put into intermediate storage there in the preceding measurement cycle. By establishing the steepness or gradient of the linear voltage/frequency characteristic of the voltage-controlled oscillator, it is possible to predetermine the number of measurement cycles which are required to adjust to zero the sum signal which is put into intermediate storage in the sample-and-hold circuit 60, when the position of the inductive position indicator does not change. That is preferably effected within a single measurement cycle. When the zero value is reached, the count value which is outputted by the main counter 64 represents a measurement value, in digital form, for the position occupied by the inductive position indicator.

If the position of the inductive position indicator changes, then at the end of the next measurement cycle, the sum signal which is supplied to the sample-and-hold circuit 60 is no longer of a value zero and the voltage-controlled oscillator of the circuit unit 61 begins to oscillate again, whereby the counter condition of the main counter 64 is altered until the sum signal is again adjusted to zero.

Like all regulating loops, the arrangement described herein also requires a certain adjustment time until the position signal outputted by the counter 64 coincides with the position actually assumed by the inductive position indicator. If now rapid movements of the position indicator are to be traced and measured, there is what is known as a trail error, that is to say the count value outputted by the main counter 64 constantly differs during such a movement from the varying position occupied by the position indicator, by a value which in turn is dependent on the speed of the variation in the position of the position indicator.

If now however the system uses the above-discussed measurement coil arrangements, as are to be found in European patent application No 92 112550.6, which supply a signal characteristic which is extremely linear in relation to distance, then the circuit arrangement described herein be the property that the magnitude of the trail error is also linearly dependent on the speed at which the position indicator moves. If the VCO also has a linear characteristic, that affords the possibility of correcting the trail error by means of an auxiliary counter as indicated at 65 and an adding/subtracting circuit 66, in such a way that the measurement value produced by the circuit arrangement 30 coincides with the actual position of the position indicator, even when it is performing rapid movements. For that purpose the count pulses generated by the voltage-controlled oscillator are also applied to the count input of the auxiliary counter 65. Unlike the main counter 64 however the auxiliary counter 65 does not sum those clock pulses over any number of measurement cycles. On the contrary, it is actuated by the system control 34, by way of its gate input, in such a way that beginning with the value zero at the beginning of each measurement cycle, it counts the pulses of the voltage-controlled oscillator 61, which are generated up to the end of the measurement cycle in question. The count condition of the auxiliary counter 65, which is reached at the end of the measurement cycle, is then added to or subtracted from the count value attained by the main counter 64, by the adding/subtracting circuit 66, depending on whether the direction signal outputted by the circuit unit 61 indicates that the position actually adopted by the inductive position indicator leads or trails relative to the position signal outputted by the counter 64 in the form of its count value.

To put that another way: at the end of each measurement cycle the deviation detected in the preceding measurement cycle between the actual position of the position indicator and the position signal produced by the main counter 64 is used to correct that position signal. Because of the linear nature of signal processing in the entire arrangement, that correction results in complete elimination of the trail error as long as the speed of movement of the position indicator does not change. If the position indicator stops, one measurement cycle is sufficient to regulate to zero the sum voltage stored in the sample-and-hold circuit 60 so that the voltage-controlled oscillator of the circuit unit 61 no longer outputs any clock pulses. As a result the count condition of the auxiliary counter 65 also remains at zero and nothing is added to or subtracted from the count value of the main counter 64, which correctly reproduces the actual position of the position indicator, so that the measurement value outputted by the circuit arrangement 30 is determined solely by the count condition of the main counter 64 until there is again a movement of the position indicator, which is of longer duration than a measurement cycle.

The output signal supplied by the auxiliary counter 65 can also serve as a speed measurement value in respect of movements of the position indicator, independently of the above-described correction in respect of the position measurement signal.

In a modified and particularly preferred form of the circuit arrangement shown in FIG. 3, the diodes 40' and 42 and the controllable switches 72 and 73 are omitted so that the output of the differential amplifier 39 is also directly connected to the controllable switches 41 and 43.

Here the peak values of the ac voltages outputted by the digital-analog converter 38 are not determined by virtue of the fact that the diodes 40' and 42 respectively admittedly permit the capacitors 45 and 46 to be charged up to those values, but do not permit discharge below the respectively attained extreme.

Instead, in this case, the system control 34 preferably controls the switches 41 and 43 respectively in such a way that they are closed and opened again in a period of time which is in the vicinity of the respective peak value. The information required for ascertaining the respective switching times is obtained by the system control 34 from the ac voltage which is preferably produced by the oscillator 35 and which is passed by way of the line 37 to the exciter coil of the inductive position indicator whose measurement signal is evaluated by the circuit arrangement 30. That system uses a suitable inductive position indicator, for example and preferably as is described in above-mentioned European patent application No 92 112550.6.

As the position indicator operates in a practically loss-free manner, between the ac voltage fed to the exciter coil and the output signals produced by the measurement coil arrangement 31 or the digital-analog converter 38, there is a phase shift which differs slightly from 180° and which is also constant virtually independently of external interference influences such as for example fluctuations in temperature. A phase shift which changes only slightly can accordingly also be compensated by a suitable circuit.

It is thus possible to sample the ac voltage signal for the exciter coil and to ascertain from its variation in respect of time the moments in time at which, as described above, the switches 41 and 43 are closed and opened in order to charge up the storage capacitors 46 and 45 as accurately as possible to the respective amplitude peak value or amplitude values which always involve the same phase position and which can therefore be compared to each other, in respect of the output signal of the digital-analog converter 38. Simultaneously with the switch 43, the feedback switch 49 is closed and opened while the feedback switch 50 is actuated simultaneously and in the same mode with the switch 41.

Those feedback effects to the negative input of the differential amplifier 39 serve to feed same with the voltage which is already present upon closure of the switches 43, 49 and 41, 50 respectively at the respectively associated storage capacitors 45 and 46, so that the differential amplifier 39 can detect the difference between that voltage and the new amplitude value which is now outputted by the digital-analog converter 38, and can charge the storage capacitor up to or discharge it to said amplitude value. In addition, that feedback effect simultaneously compensates for the voltage drop which occurs at the internal resistances of the controllable switches 43 and 41.

The discharging switches 72 and 73 of the embodiment shown in FIG. 3 are no longer required with this digital time filter arrangement as the differential amplifier 39 can both charge up and also discharge the storage capacitors 45, 46, by virtue of the omission of the diodes 40' and 42.

The particular advantage of this second variant which in other respects operates exactly like the circuit arrangement described above with reference to FIG. 3 is that therein the measurement result can be affected only by those interference voltages which occur at the moments in time at which the system control 34 closes and re-opens the switches 43, 49 and 41, 50 respectively, while the embodiment shown in FIG. 3 charges the storage capacitors 45, 46 to the respective extreme values even when they derive from interference voltages which are impressed on the measurement signal at any moments in time and exceed the peak value in absolute terms.

In order to minimize the production of interference signals, internally of the circuit, during the 'critical moments' at which the system control 34 in accordance with the second variant referred to above briefly closes and re-opens the switches 43, 49 and 41, 50 respectively, it can preferably be provided that the system control 34, in a respective brief period around such a switching moment, temporarily stops the voltage-controlled oscillator of the circuit unit 61, the counters 64 and 65, the computing means 40 and the adding/subtracting circuit 66.

Referring now to FIG. 4, in the circuit arrangement 30' shown therein, all circuit components which are to be found therein in the seine manner as in FIG. 3 are denoted by the same references and in that respect attention is therefore directed to the description thereof with reference to FIG. 3.

The most important differences between the two embodiments shown in FIGS. 3 and 4 respectively, besides the above-mentioned different positioning of the multiplying digital-analog converter 38a, are that the dc voltage values A and −B contained in the storage circuits 45 and 46 are applied by way of two impedance converters 80 and 81 which prevent discharging of the storage capacitors 45 and 46, to the two ends of a resistor series circuit 82 which is here formed by four resistors 83, 84, 85 and 86. Both the end points of the series circuit 82 and all tappings between the resistors 83–86 are connected by way of a respective specific line to a multiplexer 87 which, under the management of the system control 34, always passes one of the voltages dropped at one of the resistors 83–86 to its two outputs which are connected by way of driver stages 88 and 89 respectively to the two analog inputs of the digital-analog converter 38a which, in a corresponding manner as was described above, receives digital words from a computing means which is not separately shown here but which is conceived as being integrated into the system control 34, those digital words representing the count condition attained by the main counter 64. As in this case summing or subtraction of the two signals derived from output signals of the measurement coil arrangement already takes place at the series circuit 82, the output of the digital-analog converter 38a already has the dc voltage sum signal A• f+(−B)•g+off which is of interest here and from which it is only necessary to deduct the input offset voltage of the input amplifier 36. If the sum of f and g is equal to 1 as here, the digital-analog converter 38a requires only one digital word in each measurement cycle. That minimize interference phenomena within the integrated circuit. The input offset voltage is ascertained by means of the controllable switches 47, 51 and the storage capacitor 48 in the same manner as was described with reference to FIG. 3. Subtraction is effected in the differential amplifier 57a, the output of which then has the measurement signal which is to be regulated to zero and which, as described above, is put into intermediate storage in a sample-and-hold circuit 60.

Each of the for example eight segments of the measurement coil arrangement which resolve the full circle of 360° to be monitored with three bits is further subdivided by means of the resistance series circuit 82, the four resistors shown here supplying two further bits. Fine subdivision to achieve the high-resolution measurement value is then effected with the digital-analog converter which for example again supplies twelve bits or more so that the system gives a total resolution of 17 bits or higher.

A further difference is that in this case the auxiliary counter 65a is in the form of an up-down counter which receives the direction signal outputted by the circuit arrangement 61 by way of the line 62, like the main counter 64, in order to detect the instantaneously required counting direction. By virtue of the auxiliary counter 65a being designed in that way, the circuit arrangement 66a can be in the form of a pure adding circuit which does not have to perform any subtraction operations.

The series circuit 82 serves to enhance the resolution capability of the entire measurement arrangement without having to increase the size of the voltage divider contained in the digital-analog converter 38a. That is advantageous in particular when the circuit arrangement 30', with the exception of the series circuit 82, is in the form of an integrated circuit, and the voltage divider of the digital-analog converter 38a is formed by means of capacitors.

In that case, an increase in the resolution capability by virtue of an increase in the size of the voltage divider inevitably forces a considerable increase in the level of accuracy because otherwise for example in the attempt to switch over the instantaneous voltage divider tapping from a lower voltage value to a higher voltage value, there is a risk that the voltage which is tapped off will become smaller instead of greater, which would result in unacceptable oscillation of the regulating loop.

In order to avoid that, the capacitors of the voltage divider would have to be extremely accurate, which, above a critical value, gives rise to major increases in cost which are not acceptable in many situations which may admittedly require a high resolution capability but not a high level of accuracy in absolute terms. With the series circuit 82, the above-described risk of oscillation does not occur even when the resistors 83–86 (the number of which can be readily increased) are not of exactly the same size. Then, when switching over from one tapping pair to the adjacent pair, a somewhat different voltage difference may admittedly occur, but that voltage difference, in terms of its absolute position, always exactly adjoins the voltage difference which was detected previously at the adjacent tappings, and a steady condition therefore obtains.

The external connection of the series circuit 82 to an otherwise integrated circuit arrangement 30' also affords the advantage that, in situations of use involving low levels of requirement in terms of accuracy, less expensive resistors 83–86 can be used while with high levels of accuracy requirement which also justify a higher price, resistors 83–86 which are very accurately selected to be of the same values can be employed. In that situation the integrated circuit 30' always remains the same.

Reference will now be made to FIGS. 5 through 7 each showing a respective measurement coil arrangement as a plan view perpendicular to the axis of rotation of the position indicator or sensor which is in the form of a rotary indicator or sensor. Of the core shells, these Figures only show the external contour of the end face 17 of the projection 15, the end face 13 of the semicylindrical wall portion 9 and the end face 12 of the semicylindrical wall portion 8 of the lower core shell 4.

The circles in the end faces 12, 13 and 17 symbolically represent the magnetic flux passing through those surfaces at a respective moment at which the magnetic flux passing through the end faces 12 and 13 is going away from the person looking at the drawings while the magnetic flux passing through the end face 17 of the projection 15 is coming towards that person.

The conductors shown in solid lines are disposed on the side of the carrier plate or board 5 which is towards the person viewing the drawings, while the conductors shown in broken lines are disposed on the underside. Points at which a conductor track changes from one side of the carrier plate or board to the other in such a way that the portions extending on top and underneath are electrically conductively connected to each other are identified by a spot-like thickening. Wherever solid-line and broken-line conductor track portions are shown in parallel at a small spacing from each other, that is only for the purposes of greater clarity of the drawing. In actual fact such conductor track portions extend in mutually aligned relationship one above the other in the direction of view.

Looking at FIG. 5, the measurement coil arrangement shown therein includes a closed external circular conductor 131 which is arranged concentrically to the axis of rotation, and two closed internal circular conductors 132 and 133 which are also concentric to the axis of rotation and which are of the same size and which are arranged in mutual alignment one behind the other.

The external circular conductor 131 is electrically conductively connected to the internal circular conductor 132 by a radially extending conductor portion 134; opposite same in displaced relationship through 180° is a connecting conductor 135 which is electrically conductively connected to the internal conductor 132 and which, starting from same, extends radially outwardly in the lower conductor track plane. In that arrangement it is electrically insulated from the outer conductor 131 which is disposed on the upper conductor track plane and which in turn is electrically conductively connected to a connecting conductor 136 which in the upper conductor track plane initially extends radially outwardly in alignment with the connecting conductor 135. The two connecting conductors terminate at connecting contacts 137 and 138.

The conductors 131, 132, 134 and 135 thus embrace two surface elements 140 and 141 of a first measurement coil group, each surface element being in the shape of a semicircular ring, the surface elements being so arranged that they supplement each other to form a complete circular ring. They are separated from each other by the separating legs or separating conductors formed by the conductor portions 134 and 135.

With that arrangement, an output signal $\Delta U_1$ is obtained between the two conductors 135 and 136; for the position of the face 12 shown in FIG. 5, that output signal is of a value zero and after a rotary movement of that face 12 through 90° upwardly or downwardly, the output signal is of a positive or negative extreme value and after a rotary movement through 180° it is again of a value zero. This procedure is described in detail in European patent application No 92 112550.6 to which further reference may be made. Between the above-mentioned values, the envelope curve of the ac voltage $\Delta U_1$ is of a triangular configuration which in the region of the passages through zero has very good linearity which however in the region of the apexes of the triangle deteriorates, the more one of the two end edges 25 and 26 of the face 12 approaches the separating leg 134 or the connecting conductor 135 respectively. The signal $\Delta U_1$ has the important property that all additive interference values are eliminated therefrom.

A second difference signal $\Delta U_2$ is obtained by means of a second group of surface elements 142 and 143 which are of the same shape as the surface elements 140 and 141 and which are disposed in alignment therewith in a radial direction but are turned through 90° relative thereto in the peripheral direction. The surface elements 142 and 143 of the second group are delimited in the radial direction by the outer conductor 131 and the inner conductor 133 and are separated from each other by the conductor portion 144 and the connecting conductor 145 which are arranged and electrically conductively connected in a manner as was described above in relation to the conductor portion 134 and the connecting conductor 135. A similar consideration applies to the connecting conductor 146. The two connecting conductors 145 and 146 terminate at connecting contacts 147 and 148 at which the second difference voltage $\Delta U_2$ can be tapped off.

As the two groups of surface elements 140, 141 and 142, 143 are of identical structure, the foregoing description relating to the difference voltage $\Delta U_1$ applies in the same fashion in relation to the voltage $\Delta U_2$. The only difference is that $\Delta U_2$ is displaced relative to $\Delta U_1$ through an angle of rotation of 90°.

The two difference signals $\Delta U_1$ and $\Delta U_2$ can now be used to ascertain a measurement value M by means of the circuit arrangements 30 and 30' which are shown in FIGS. 3 and 4 respectively and whose respective multiplexer is connected by way of the multiple line 32 to the pairs of connection contacts 137, 138 and 147, 148, in such a way that the difference signals are fed in succession in respect of time by the multiplexer 33 into the single-channel signal processing section. When the difference signal $\Delta U_1$ is applied to the input amplifier 36, the signal which occurs downstream of the diode 40' corresponds to the above-described signal A+off while when the difference signal $\Delta U_2$ is applied the result downstream of the diode 42 is a signal corresponding to the above signal −B+off.

The measurement value M can be produced from those signals for example by formation of the following quotient:

$$M = \frac{A + \text{off}}{(A + \text{off}) - (-B + \text{off})}$$

which can be converted into the regulating loop equation as follows:

$$A \bullet (M-1) + B \bullet M - \text{off} = 0$$

Here the above-described factors g and f are therefore formed directly by the measurement value M and the value M−1 respectively, so that the computing means 40 is of a particularly simple design configuration. More specifically, when the signal $\Delta U_2$ is processed, it only has to apply the count condition of the main counter 41 unaltered to the digital-analog converter 38 as that count condition forms the word corresponding to the value M. If the signal $\Delta U_1$ is being processed, the computing means 40 applies to the digital-analog converter 38 the digital word corresponding to the value M−1 in which all places which are occupied in the digital word corresponding to the value M with logic '1' are occupied with logic '0', and vice-versa. In the periods in which the multiplexer 33 short-circuits the input of the input amplifier 36, the computing means 40 here applies to the digital-analog converter 38 a digital word in which all places are occupied by a logic '1'. As a result, the storage capacitors 45, 46 and 48 store the signals (A+off)•(M−1), (−B+ off)•M and off which are summed by the summing network 54–58. In the above-described manner the regulating loop changes the count condition M of the counter 41 until the sum signal outputted by the summing network 54–58 is equal to zero. Then the count condition M of the counter 41 is the measurement value which is being sought and which reproduces in digital form the instantaneous angle of the rotary position indicator.

It will be noted that the extremely precisely linear configuration of the difference signals $\Delta U_1$ and $\Delta U_2$ can be attained with the embodiment shown in FIG. 5 only for an angular range <360°. More specifically, for the signals a $\Delta U_1$ and $\Delta U_2$, there are angular ranges 2α which are symmetrical relative to the separating legs or conductors 134, 144 and the connecting conductors 135, 145 respectively and in which a signal $\Delta U_1$ and $\Delta_2$ respectively can admittedly be obtained, although the configuration thereof differs from linearity to an increasing extent in proportion to the degree to which one of the end edges 25 and 26 moves towards one of the conductors 134, 144 and 135, 145 respectively. Those angular ranges 2α which can no longer be used for producing a linear measurement signal must be selected to be of increasing magnitude, the higher the levels of requirement in respect of linearity. If the levels of requirement in terms of linearity are low, then for example α=15° may be entirely adequate while for high levels of accuracy α=30° or even 45° must be selected. Thus, the arrangement shown in FIG. 5 affords four measurement ranges which are separated from each other, each of 90°−2α which each cover a rotary angle of 60° with low levels of linearity requirement. With a very high degree of accuracy, it is only possible to use the measurement range which extends in a clockwise direction from the broken line 149a to the broken line 149b, and that is adequate in many cases.

If larger measurement angles are to be covered, with a high degree of accuracy, it is then possible to provide three or four of the groups of surface elements as shown in FIG. 5, which are then arranged to be turned relative to each other through 60° or 45° in each case. That system then provides three or four difference signals, of which a respective pair is always used for the above-described quotient-formation operation, at a given moment, by means of the multiplexer 33. These are then the two difference signals of the groups of surface elements, from whose separating conductors and output conductors the end edges 25 and 26 of the transit surface are at the greater angular spacings, at the moment in time which is being considered.

With three such groups of surface elements, each of which group again supplies a sufficiently linear difference signal over a measurement range of 120°−2α, it is possible to cover the total range of 360° if α does not have to be greater than 30°.

If the requirement is for a degree of linearity for which α must be equal to 45°, that can be achieved with four groups of surface elements of the above-described kind which are each displaced relative to each other through 45°. It will be appreciated that such configurations can no longer be achieved with two conductor track planes and problems may arise with the accuracy of adjustment with which the surface elements of the various groups have to be brought into alignment in a radial direction.

In order to avoid such difficulties, it is possible to adopt the measurement coil arrangement indicated at 150 in FIG. 6, which uses two conductor track planes for forming four groups each of two surface elements, each of which extends over 180°. For that purpose, besides a closed external circular conductor 131 which here repeatedly changes the conductor track plane, and two closed internal circular conductors 132 and 133 which are arranged in alignment one behind the other, the measurement coil arrangement 150 comprises eight radially extending conductor portions 151 through 158 which are arranged at respective angular spacings of 45° in such a way that they are disposed in pairs in diametrally opposite relationship.

The conductor portions 151 through 158 are alternately electrically conductively connected to one or other of the two internal conductors 132 and 133 respectively. However, at the points at which they cross over the external conductor 131, they are electrically insulated therefrom. In relation to each of the conductor portions 151 through 158, a respective conductor portion 161 through 168 which initially also extends radially and which is electrically conductively connected to the external conductor 131 extends outwardly in the respective other conductor track plane in alignment with the respective conductor portions 151 through 158. At a radial spacing at which the radial leakage fields have substantially decayed, the conductor portions 161 through 168 depart from their condition of extending in alignment with the respectively associated conductor portions 151 through 158 and terminate at pairs of connecting contacts 170 through 177 which are connected to the multiplexer 33 by way of the multiple line indicated at 32 in FIG. 3.

The multiplexer can here perform a dual function. On the one hand, it can electrically conductively interconnect the terminals of each pair of contacts 170 through 177 by way of an on/off switch contained in the multiplexer, or separate such terminals from each other, and select from the multiplicity of pairs of connecting contacts which are not connected together, those two at which the difference signals which are to be used for measurement value formation in the instantaneous position of the rotary position indicator are taken off. On the other hand, as described above, the multiplexer can again feed those two difference signals into the single-channel signal processing section of the circuit arrangement 30 shown in FIG. 3.

A particular advantage of this single-channel signal processing action in conjunction with the measurement coil arrangement 150 shown in FIG. 6 is that it makes it possible to save on one of the two internal conductors 132 or 133 as there is only ever one difference signal that is required at any time, and thus there is also only ever one of the pairs of connecting contacts that has to be bridged by a closed on/off switch. Then, all conductor portions 151 through 158 are electrically conductively connected to the remaining internal conductor 132 or 133.

Accordingly therefore each pair of conductor portions 151, 161 through 158, 168 can serve either as a connecting conductor for taking off a difference signal or as a separating portion which, when the associated on/off switch is closed, separates from each other the surface element regions which immediately adjoin same in the peripheral direction so that those surface element regions belong to difference surface elements of the seine group of measurement coils. When the switch is open the respectively associated conductor portion does not have any separation action so that surface element regions adjoining same belong to the same surface element.

If the multiplexer, in conjunction with a two-channel circuit arrangement, is only used for controlling the on/off switch and for selection of the pairs of connecting contacts which serve to take off the difference signals, then in operation it always closes two on/off switches while it opens all others. Which switches are opened or closed depends on the respective position and direction of movement of the transit surface which is defined by the face 12.

If it is assumed for example that the transit surface defined by the face 12 is to be moved in the counter-clockwise direction from the position shown in FIG. 6, the multiplexer closes the on/off switches associated with the pairs of connecting conductors 156, 166 and 157, 167 so that the separating portions or conductors 156, 157 associated therewith are effective. As each of the portions 156, 157 is electrically conductively connected to the external conductor 131 and one of the two internal conductors 132 and 133, two groups of surface elements are formed, which are radially aligned and which are displaced relative to each other through 45° in the direction of displacement.

The one group of surface elements includes the two surface elements which each cover 180° and which are therefore of a semi-annular configuration and which extend from the separating portion 156 to the pair of connecting conductors 152 and 162, while the other group includes the semicircular surface elements which extend from the separating portion 157 to the pair of connecting conductors 153 and 163. At the associated pairs of connecting contacts 171 and 172 respectively, the difference voltages $\Delta U_1$ and $\Delta U_2$ are taken off for the range of movement of 45° in which the end edge 25 of the face 12 moves from the illustrated position to the conductor portion 155 which is inoperative at that time, while the opposite end edge 26 moves to the conductor portion 151 which is also inoperative at that time.

In the one limit position of the above-described rotary movement which extends over 45°, the end edges 25 and 26 are at an angular spacing of 90° and 45° from the respectively most adjacent 'operating' separating portion 156 and 157 respectively. In the other limit position those spacings are 90° and 45° respectively and they therefore never fall below a value of 45°.

If the end edge 25 of the face 12 continues to move in the counter-clockwise direction beyond the inoperative conductor portion 155, the multiplexer immediately opens the switch belonging to the pair of conductors 156 and 166 and closes the switch associated with the pair of connecting conductors 158 and 168. The former is necessary because otherwise the end edge 25 would be less than the angular spacing of 45° from the most closely adjacent 'active' separating portion; while the latter is possible because the annular spacing of the end edge 26 from the separating portion or conductor 158 which is freshly brought into operation is greater than 45°. In that new switch position the difference signals are taken off at the pairs of connecting contacts 172 and 173.

In the event of a continuing rotary movement, a corresponding switching-over action can take place both in respect of the 'active' separating portions or conductors and also the pairs of connecting contacts which are used for taking off the difference signals $\Delta U_1$, $\Delta U_2$, and it is possible to trace and measure rotary movements beyond 360° in both directions without falling below the critical edge spacing angle $\alpha=45°$ which is assumed to apply here.

A corresponding consideration also applies when using the circuit arrangement 30 which is of a single-channel nature in the input portion, except that the multiplexer 30 successively closes within a measurement cycle the switches which in the above description are closed simultaneously.

Both situations retain the principle that two difference signals are taken off at two groups of measurement coils or the surface elements thereof, wherein the surface elements of a group supplement each other to define a full circular ring configuration. They are separated from each other on the one hand by a radially extending separating portion or conductor which interconnects the internal and external circular conductors, and on the other hand by a diametrally oppositely disposed pair of connecting conductors at which the respective difference voltage occurs. The two groups formed in that way are displaced through 45° relative to each other and supply two difference signals which are phase-shifted relative to each other and which are used to form a quotient in the above-described manner.

The essential difference in relation to the embodiments described with reference to FIG. 5 is that the angular position of the groups of surface elements is not invariably fixed. On the contrary the groups of surface elements in this case can move along with the transit surface by opening and closing of the on/off switches in the multiplexer. That 'movement' of the groups of surface elements is controlled in such a way that the angular spacing between one of the end edges 25 and 26 and the most closely adjacent operative separating portion or conductor or the most closely adjacent operative connecting conductor never becomes less than 45°. That therefore provides a measurement coil arrangement 150 with first and second conductor track planes, which satisfies the high levels of requirement in terms of linearity and symmetry in respect of the measurement signal, corresponding to that large angle α.

If the requirements made are at a somewhat lower level, it is sufficient to provide only three controllable separating portions at angular spacings of 60° and three respectively diametrally oppositely disposed pairs of connecting conductors.

With such an arrangement which also only requires two conductor track planes and a correspondingly smaller number of switches, it is then possible to observe an edge spacing α=30°.

For many situations of use it is desirable to provide a rotary position indicator which resolves the full measurement angle range of 360° with fifteen bits or more. With conventional measurement coil systems and evaluation circuits, that gives rise to problems in particular if the circuit arrangement is to be in the form of an integrated circuit as the cost of integrated analog-digital converters increases in proportion to an increasing number of bits to be processed thereby. A limit which is deemed to be a critical limit from economic points of view is twelve bits. It is here that the embodiment shown in FIG. 6, in conjunction with the multiplexer 33, affords the advantage that the three most significant bits can be displaced into the measurement coil arrangement so that, with an overall degree of resolution of fifteen bits, the analog-digital converter only has to resolve twelve bits. A corresponding point also applies in regard to the embodiment shown in FIG. 7 if it is enlarged to eight surface elements, instead of the six surface elements described. Because of the change in sign which one of the two signals A, B experiences in that arrangement, that embodiment is even capable of resolving one bit more. As it is possible for the measurement coil arrangements of FIGS. 6 and 7 also to be designed with sixteen surface elements, in that case either the number of bits of the multiplexer can be lowered to eleven or the overall resolution can be increased to sixteen bits.

Referring now to FIG. 7, shown therein is a measurement coil arrangement 180 which includes six surface elements 181 through 186 which are each in the form of part of a circular ring and each of which extends over an angle of 60° and which are of the same internal and external radii respectively, which are selected to be somewhat smaller and somewhat larger respectively than the internal and external radii of the face 12 which here also defines the transit surface.

The surface elements 181 through 186 are arranged adjoining each other in such a way that they supplement each other to define a full circular ring which is concentric relative to the axis of rotation. Each surface element 181 through 186 is enclosed by its own measurement coil winding with its own pair of connecting conductors 188 through 193. Each measurement coil winding lies partially in the upper conductor track plane and partially in the lower conductor track plane so that the common edge regions of each two surface elements which adjoin each other in the peripheral direction, for example the surface elements 181 and 186, are formed by two radially extending edge conductors 196 and 197 which are admittedly shown side-by-side in FIG. 7 but which in actual fact are disposed precisely in alignment one over the other. It should be expressly pointed out that this applies not only in relation to the pair of edge conductors 196 and 197 which have been referred to by way of example, but also in the same manner in regard to all other pairs of edge conductors.

The pairs of connecting conductors 188 through 193 can again be connected to the multiplexer shown at 33 in FIG. 3 by way of the multiple line 32.

This embodiment also provides that, for each angular position of the transit surface defined by the end face 12, there are formed two groups, which are angularly displaced relative to each other, of surface elements whose edge conductors are at an angular spacing which is never less than a critical value α from the end edges 25 and 26 of the face 12. In the illustrated construction with six surface elements, the angle α is 30°. With eight surface elements of a corresponding design configuration and in a corresponding arrangement, it is also possible here to achieve a value for α of 45°.

In the embodiment shown in FIG. 7, when the transit surface defined by the face 12 is in the illustrated position, the one group comprises on the one hand the surface elements 181, 182 and 183 which go to make up a semicircular ring, and on the other hand the surface elements 184, 185 and 186 which go to make up the complementary semicircular ring, while the other group comprises the surface elements 182, 183 and 184 which go to make up a semicircular ring, and the surface elements 185, 186 and 181 which form the complementary semicircular ring.

Taking the output voltages of the measurement coils of those two groups, it is possible to form the difference voltages as follows:

$$\Delta U_1 = U_{181} + U_{182} + U_{183} - (U_{184} + U_{185} + U_{186})$$

and $$\Delta U_2 = U_{182} + U_{183} + U_{184} - (U_{185} + U_{186} + U_{181})$$

Admittedly the end edges 25 and 26 of the face 12 are disposed directly at the edges between the surface elements 185, 186 and 182, 183 respectively. As however it is only the sums of the voltages which are produced by the measurement coil windings of those surface elements, that are involved in the above-specified difference voltages, any leakage field effects which occur here do not exert any influence. The edge regions which are operative when the situation is considered in that fashion are those between the surface elements 183, 184 and 186, 181 (first group) and between the surface elements 184, 185 and 181, 182 (second group). However, the end edges 25, 26, in the illustrated position, are at an angular spacing of at least 60° from those four edge regions so that they can be displaced through 30° both in the clockwise direction and also in the opposite direction, without falling below the minimum angular spacing α=30°. Therefore, for the above-indicated combinations of surface elements, there is a range of movement of 60° in which the linearity of the two difference signals $\Delta U_1$ and $\Delta_2$ satisfies the requirements corresponding to a minimum angular spacing $\alpha=30°$.

If now the following quotient is formed:

$$\frac{\Delta U_1 + \Delta U_2}{\Delta U_1 - \Delta U_2}$$

then after elimination of the identical voltages with the opposite sign, that gives the following expression:

$$\frac{2U_{182} + 2U_{183} - 2U_{185} - 2U_{186}}{2U_{181} - 2U_{184}} = \frac{(U_{182} - U_{185}) + (U_{183} - U_{186})}{(U_{181} - U_{184})}$$

Those voltage differences can be produced by means of switches which are integrated in the multiplexer, by a procedure whereby the measurement coils in question are connected in series with each other with a suitable winding direction. It can be shown that, for any position of the transit surface defined by the face 12, by virtue of a permutation performed by means of the multiplexer, in respect of those three voltage differences $U_{182}$–$U_{185}$, $U_{183}$–$U_{186}$, $U_{181}$–$U_{184}$, it is possible to form a quotient, representing the measurement signal, of the form A/B produced as described with reference to FIG. 3, in which two other voltage differences form the numerator and the respective third voltage difference forms the denominator.

It will be seen therefore that, by suitable actuation of the multiplexer, it is also possible in this case to simulate 'movement' of the groups of surface elements with the transit surface, as was described above with reference to FIG. 6. In this case also the measurement signal has the property that additive interference phenomena are eliminated therefrom, by virtue of the difference-formation operations, and the influence of multiplicative interference is eliminated by virtue of the quotient-formation operation.

It will be seen that the voltage difference $U_{181}$–$U_{184}$, which forms the denominator of the quotient on the right in the above equation, remains constant upon a displacement of the transit surface from the illustrated position through 30° in one direction or the other, while $U_{182}$–$U_{185}$ and $U_{183}$–$U_{186}$ vary linearly in opposite relationship. That again gives a measurement signal with the desired linear configuration.

In this case also it is possible by means of the multiplexer to use a circuit arrangement which is of a single-channel nature in the input portion or a circuit arrangement which has two input channels, to obtain the measurement signal.

Although the use of the circuit arrangements according to the invention was described above with reference to FIGS. 3 and 4 only in connection with inductive rotary sensors or indicators, it should be noted that the circuit arrangements according to the invention can also be used in a corresponding fashion in relation to linear inductive position indicators or sensors and more especially in conjunction with the measurement coil arrangements described for such indicators or sensors in DE-A-41 27 209.

It will be appreciated that the above-described embodiments of the present invention have been set forth solely by way of example and illustration thereof and that various modifications and alterations may be made therein without thereby departing from the spirit and scope of the present invention.

What is claimed is:

1. A circuit arrangement for an inductive position indicator which monitors a position to be monitored which a first one of two bodies being movable with respect to each other occupies with respect to a second one of said two bodies, said position indicator comprising at least one exciter coil to which an ac voltage is fed to generate a magnetic flux, a measurement coil arrangement having a plurality of measurement coils from which at least two different measurement coil signals can be taken simultaneously, flux guide means of ferromagnetic material which guide the magnetic flux generated by said exciter coil such that the magnetic flux through at least one of said measurement coils and thereby at least one of said at least two different measurement coil signals varies in dependence on said position to be monitored, said circuit arrangement comprising a multiplexer for taking both of said at least two different measurement coil signals and feeding them one by one to an input amplifier providing amplified measurement coil signals, said input amplifier being part of a single-channel signal processing means providing a first single-channel output signal when a first one of said at least two different measurement coil signals is fed to said input amplifier and providing a second single-channel output signal when a second one of said at least two different measurement coil signals is fed to said input amplifier, a de-multiplexer for taking said first and second single-channel output signals one by one and feeding said first one of them into a first signal channel and said second one of them into a second signal channel each of said first and second signal channels leading to one of two inputs of a computing circuit means which requires said first and second single-channel output signals at the same time in order to produce a computing circuit output signal from which a measurement signal can be derived which represents said position to be monitored, wherein at least said first signal channel comprises a circuit means for storing or delaying said first single-channel output signal fed thereto by said de-multiplexer until said second single-channel output signal is fed by said de-multiplexer to said second signal channel.

2. A circuit arrangement as set forth in claim 1, wherein said single-channel signal processing means comprises a circuit means for weighting with factors said amplified measurement coil signals from said input amplifier and wherein said computing circuit means is adapted to generate a computing circuit output signal which contains the sum of said first and second single-channel output signals fed to its at least two inputs at the same time.

3. A circuit arrangement as set forth in claim 1, wherein said computing circuit means comprises a circuit means for summing and weighting with factors said first and second single-channel output signals so that said computing circuit output signal contains the weighted sum of said first and second single-channel output signals fed to its at least two inputs at the same time.

4. A circuit arrangement as set forth in claim 2 or 3, wherein circuit means for generating and varying a control signal for said factors are provided said control signal being varied until said computing circuit output signal obtains a value which is equal to a predetermined value.

5. A circuit arrangement as set forth in claim 2, wherein said circuit means for weighting with factors is a multiplying digital-analog converter having an analog voltage input to which said amplified measurement coil signals which are to be weighted are applied, and a digital input, and wherein a first counter is provided which counts output pulses from a voltage controlled oscillator means whose control input receives said computing circuit output signal, said first counter being operable to count up when the value of said computing circuit output signal is lower than said predetermined value and to count down when the value of said computing circuit output signal is higher than said predetermined value.

6. A circuit arrangement as set forth in claim 3, wherein said circuit means for summing and weighting with factors comprises a resistor series circuit which comprises several resistors and has two end points and tappings between said resistors, each of said end points and each of said tappings being connected to a corresponding input of a second multiplexer by an individual line and said end points being the two inputs of said computing circuit means to which said first and second single-channel output signals are applied, and a multiplying digital-analog converter having two analog voltage inputs to which said second multiplexer connects selection of two of said individual lines from said end points and tappings, and a digital input, and wherein a first counter is provided which counts output pulses from a voltage controlled oscillator means whose control input receives said computing circuit output signals, said first counter being operable to count up when the value of said computing circuit output signal is lower than said predetermined value and to count down when the value of said computing circuit output signal is higher than said predetermined value.

7. A circuit arrangement as set forth in claim 5 or 6, further including a second counter which, for each period of time needed for obtaining a computing circuit output signal counts the output pulses of said voltage-controlled oscillator means such that it starts from a count value of zero and ends with an auxiliary count result which is added to a simultaneously obtained count result of said first counter when said value of said computing circuit output signal is lower than said predetermined value and is subtracted from a simultaneously obtained count result of said first counter when said value of said computing circuit output signal is higher than said predetermined value.

8. A circuit arrangement as set forth in claim 1, wherein each of said first and second signal channels leading from said de-multiplexer to said computing circuit means comprises a circuit means for storing or delaying the respective first or second single-channel output signal from said de-multiplexer.

9. A circuit arrangement as set forth in claim 8, wherein each of said circuit means for storing or delaying said first or second single-channel output signals comprises a capacitor, and wherein said de-multiplexer comprises a controllable switch means adapted to feed said first single-channel output signal to said capacitor in said first signal channel and to feed said second single-channel output signal to said capacitor in said second signal channel.

10. A circuit arrangement as set forth in claim 9, wherein said first and second single-channel output signals are ac voltage signals and wherein said controllable switch means is adapted to be closed for a time period at a moment in which the respective one of said first and second single-channel output signals is in a range where it has a low voltage gradient dU/dt, said controllable switch means also being adapted to be opened again in said range.

11. A circuit arrangement as set forth in claim 10, wherein said ac voltage signals are sinusoidal voltages having positive and negative peaks and wherein closing and opening of said controllable switch means is effected near one of said peaks.

12. A circuit arrangement as set forth in claim 10 and further including a system control means for controlling opening and closing of said controllable switch means, said system control means determining switching times by evaluating said ac voltage which is fed to said exciter coil of said inductive position indicator.

13. A circuit arrangement as set forth in claim 10, wherein whenever one of said controllable switch means is opened individual portions of the circuit arrangement which can possibly form sources of interference voltage peaks are stopped for a short period of time which begins prior to and terminates after said time period during which the respective controllable switch means is closed.

14. A circuit arrangement as set forth in claim 1 with an input amplifier having an input offset voltage which cannot be neglected, wherein said multiplexer is adapted to short-circuit the input of said input amplifier for selectable periods of time thereby to compensate for the input offset voltage of set input amplifier and wherein each signal produced by said input amplifier in said period of time is used as a correction value for the computing circuit output signal obtained a short time before or after the respective period of time.

15. A circuit arrangement as set forth in claim 14, wherein said circuit arrangement further includes a signal storage circuit means for intermediate storage of a signal reproducing the input offset voltage of said input amplifier.

16. A circuit arrangement as set forth in claim 1, wherein said measurement coil signals are difference signals.

17. A circuit arrangement as set forth in claim 1, wherein said multiplexer comprises controllable switch means which can be controlled to connect two or more of said measurement coils with each other in order to obtain one common measurement coil signal from these connected measurement coils.

* * * * *